US012694648B2

(12) United States Patent
Iliffe-Moon

(10) Patent No.: US 12,694,648 B2
(45) Date of Patent: Jul. 28, 2026

(54) METHOD FOR A VEHICLE FOR ESTIMATING A USER CONTEXT, DATA PROCESSING DEVICE, VEHICLE, COMPUTER PROGRAM AND COMPUTER-READABLE STORAGE MEDIUM

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 563 days.

(21) Appl. No.: 18/311,728

(22) Filed: May 3, 2023

(65) Prior Publication Data

US 2024/0005636 A1 Jan. 4, 2024

(30) Foreign Application Priority Data

Jun. 29, 2022 (DE) ..................... 10 2022 116 142.0

(51) Int. Cl.
| | |
|---|---|
| *G06V 10/70* | (2022.01) |
| *G06V 10/764* | (2022.01) |
| *G06V 20/59* | (2022.01) |

(52) U.S. Cl.
CPC .......... *G06V 10/768* (2022.01); *G06V 10/764* (2022.01); *G06V 20/597* (2022.01); *G06V 2201/02* (2022.01)

(58) Field of Classification Search
CPC .. G06V 10/768; G06V 10/764; G06V 20/597; G06V 2201/02
See application file for complete search history.

(56) References Cited

U.S. PATENT DOCUMENTS

| | | | | |
|---|---|---|---|---|
| 10,293,768 | B2 * | 5/2019 | Sham ..................... | G06V 20/56 |
| 10,402,147 | B2 * | 9/2019 | Gage ................... | B60N 2/0025 |
| 2017/0220874 | A1 * | 8/2017 | Ayvaci ................... | G06F 18/22 |
| 2020/0394428 | A1 * | 12/2020 | Turcot ................. | G06V 20/59 |
| 2022/0011129 | A1 * | 1/2022 | Hubbell ................ | H04W 4/48 |
| 2023/0320551 | A1 * | 10/2023 | Orzechowski ......... | G06V 10/56 701/28 |
| 2024/0005636 | A1 * | 1/2024 | Iliffe-Moon ......... | G06V 10/764 |

FOREIGN PATENT DOCUMENTS

WO WO-2022019173 A1 * 1/2022 ............ B60W 50/10

OTHER PUBLICATIONS

German Search Report corresponding to German Patent Application No. 10 2022 116 142.0, dated Feb. 17, 2023. (6 pages).

* cited by examiner

*Primary Examiner* — Shaghayegh Azima
(74) *Attorney, Agent, or Firm* — Maginot, Moore & Beck LLP

(57) ABSTRACT

A method for a vehicle for estimating a user context includes acquiring, by a camera of the vehicle, image information relating to an output device of a user terminal device. The method also includes obtaining, by performing classification based on the image information, device status information relating to the user terminal device, and estimating the user context based on the device status information.

20 Claims, 2 Drawing Sheets

(A)

(B)

(C)

100

110 ACQUIRING IMAGE INFORMATION

120 OBTAINING DEVICE
STATUS INFORMATION

130 ESTIMATING USER CONTEXT

140 CONTROLLING ASPECT
OF VEHICLE

150 ESTIMATING PERFORMANCE
INDICATOR

160 PERFORMING MACHINE
LEARNING PROCEDURE

METHOD FOR A VEHICLE FOR ESTIMATING A USER CONTEXT, DATA PROCESSING DEVICE, VEHICLE, COMPUTER PROGRAM AND COMPUTER-READABLE STORAGE MEDIUM

This application claims priority to German Patent Application No. 102020116142.0 filed on Jun. 29, 2022, the disclosure of which is incorporated in its entirety by reference herein.

TECHNICAL FIELD

The present disclosure relates to the field of estimating the context of a user in or for a vehicle.

BACKGROUND

Each of the user-friendliness of a vehicle, the experience of a user of interacting with the vehicle, and/or a driver assistance function relates to a context of the user. The user might perceive a function of the vehicle different, depending on the context. What the user might do and think at any point in time and patterns of behavior can provide a basis for the informed creation and/or control of more relevant and smarter vehicle control to improve any of the above-mentioned aspects.

Typically, a user carries a user terminal device, e.g., a smartphone, a tablet, a wearable, that enables communication, navigation, entertainment and/or information. While using a vehicle, the user, such as a driver or a passenger, might actively use the user terminal device. The user terminal device might be connected to, i.e., paired with, the vehicle. For example, the user might connect the user terminal device to the vehicle via Bluetooth, BLE, UWB, NFC and/or WiFi. Via a connection between the vehicle and the user terminal device, detailed information may be shared between the vehicle and the user terminal device.

U.S. Pat. No. 10,552,458 B2 discloses a data transmission device that transmits data to another node, the data transmission device including: data storing unit for storing data; summary information storing unit for classifying data stored in the data storing unit into prescribed groups and for storing summary information that represents the number of pieces of data for each group; receiving unit for receiving summary information from the other node; selecting unit for selecting data to be transmitted based on the summary information received from the other node; and transmitting unit for transmitting the data selected by the selecting unit. The selecting unit favorably preferentially selects data included in a group with a smaller number of pieces of data based on the summary information received from the other node. Due to such a configuration, information with a high possibility of not being possessed by a communication partner can be selected and transmitted in a data sharing system.

The user terminal device could be a rich source of data relating to the context of the vehicle driver or passenger. However, this data might not be available to the vehicle. Reasons may include firewalling of vehicle data connections, limitations of data protocols and data transmission technologies, privacy settings, connectivity limitations, e.g., maximum number of communication channels and/or connected user terminal devices, user choice and/or lack of user knowledge to connect the user terminal device. Thus, the user terminal device may be unconnected, i.e., unpaired, with the vehicle, either by choice or not by choice. Thus, the user terminal device and/or not all of the user terminal devices within the vehicle are connected to the vehicle. Thus, the ability to understand the context of the user is therefore limited. Furthermore, privacy is a general concern if information may be shared between the vehicle and the user terminal device.

In the light of this prior art, the object of the present disclosure is to provide a method being suitable for improving the above-mentioned aspects of the prior art.

SUMMARY

The above-described object is addressed by features and embodiments disclosed herein.

More specifically, the object is solved by a method for a vehicle for estimating a user context, as well as by a data processing device and/or a vehicle that assists in performing, or performs, the method.

The method comprises the steps of: acquiring, using a camera of the vehicle, image information relating to an output device of a user terminal device; obtaining, by performing classification based on the image information, device status information relating to the user terminal device; and estimating the user context, based on the device status information.

Therein, it is realized that for determining the user context, understanding, at a high level, how a vehicle occupant as the user uses the user terminal device can be a rich source of context information. The user context may be defined as the interrelation of the user with the user terminal device, the vehicle and/or a function thereof. The user context may comprise pieces of information relating to a location of the vehicle, a vehicle mode, functions, features, date and/or time. The context information may be used to orchestrate experiences and curate vehicle functions and features to consider, complement and/or enrich the overall experience within the vehicle and/or a specific function that relates to the user terminal device.

While object classification according to the prior art is focused on recognizing physical objects, it is realized that an opportunity lies in the recognition and classification of image information relating to the output device, such as a screen and/or a display, that potentially may have a dynamic appearance. The output device may output information that is more relevant to the context than the presence of a physical object.

Furthermore, it is realized that the output device of the user terminal device may be perceivable by the camera with a certain "pixel signature". The pixel structure may be acquired as the image information relating to the output device which may display information and/or content. The pixel signature is indicative and/or relatively unique for the device status. By assessing the pixel signature, obtaining detailed knowledge of a screen content which is displayed by the output device, i.e., of any pixel and/or piece of information which is displayed, may be dispensed with. Thus, pairing the user terminal device with the vehicle may be dispensed with.

According to the method, a classification, also called identification and/or categorization, of the image information is performed. Therein, the pixel signature and/or the corresponding image information is classified by a data processing device to obtain the device status. The device status comprises information which relates to the status of the user terminal device.

Due to obtaining the image information as the pixel signature, privacy concerns are resolved. Since the image which is acquired by the camera may comprise a low resolution there is no personalized content that is revealed or shared. For transparency it is possible for the system to share an image or preview of what is being observed by the camera and/or obtained by classification.

The method of estimating the user context may enable new applications and/or new use cases, since a standard resolution camera may recognize the user terminal device and classify the characteristics of the output device of the user terminal device at a distance that is characteristic for a distance within a cabin of the vehicle.

The classification may be based on at least one pixel being acquired as image information. The output device may comprise a plurality of output pixels. However, due to the resolution of the camera, an optics of the camera and/or a distance between the camera and the output device, a number of pixels being less than the number of output pixels may be acquired by the camera. This embodiment has realized that one pixel may be sufficient to perform a meaningful classification to obtain device status information, e.g., regarding the information whether the user terminal is switched off or on and/or the output device is active or inactive. The more pixels are comprised by the image information, the more meaningful the classification may be.

The image information may comprises a sequence of image data being captured by the camera consecutively. This may allow to estimating the context in a time-resolved manner. Therein, the sequence may be classified, each of the image data may be classified as explained with reference to the image information and/or tracking may be performed to characterize the sequence of image data and to obtain the device status information.

The device status information may comprise user interaction information. Therein, the device status may comprise a piece of information that relates to variations of the device status due to user interaction. The user interaction may further enhance estimating the user context. E.g., two different pieces of image information may relate to different applications which are executed by the user terminal device. Then, a transition between the two applications may be indicative for the user context.

The device status information may comprise user terminal device information relating to a type, an arrangement and/or an identity of the user terminal device. Each of the type, the arrangement and the identity of the user terminal device may provide information that relate to the context. E.g., the type may be a smart watch, a smart phone, a tablet computer. The classification of the image information may lead to a different device status information for different types of user terminal devices. The arrangement, e.g., whether the user terminal is actively carried, worn on a wrist of the user or not in the field of view of the user may lead to a different device status information and/or user context. The identity of the user terminal device may be indicative of the user and thus allows for a user-specific and thus more accurate estimating of the user context. In other words, the relationship between the user terminal device and the vehicle and/or a cabin surfaces or feature is considered, e.g., where the smartphone is placed and/or if the smartphone is in a holder or charger.

Additionally or alternatively, the device status information may comprise application information relating to an application which is executed by the user terminal device. In other words, the device status information may comprise an application status, e.g., whether the user terminal device is locked or unlocked, a home screen is displayed, which category of application is displayed, which specific application is displayed.

Additionally or alternatively, the device status information may comprise content information relating to a cognitive content of application which is executed by the user terminal device. In other words, the device status information may comprise an application content. Whilst the system could be used to understand detailed aspects that relate to the content of an application, this may be dispensed with to maintain privacy.

The image information may relate to a user of the vehicle and/or of the user terminal device; wherein the method comprises obtaining user information based on the image information; and wherein the user context is estimated based on the user information. In other words, the relationship between the user and the user terminal device may be recognized and/or tracked. For example, tracking of hands, fingers, identification of a seat at which the user sits and/or the user who operates with the user terminal device, facial recognition and/or a correlation thereof may be used to improve estimating the user context.

The method may comprise the step of: controlling a user entertainment device in dependence on the user context. Additionally or alternatively, the method may comprise the step of: controlling the user terminal device in dependence on the user context. Additionally or alternatively, the method may comprise the step of: controlling a driver assistance device in dependence on the user context. In other words, information related to the user terminal device, the user and optionally other objects are aggregated as an input to control and/or a factor to influence the user terminal device, the vehicle, functions and/or features thereof. For example the vehicle system may issue a notification, promote or prioritize an application or software mode, feature and/or function, change the appearance or function of the digital infotainment system and/or displays, engage multi-sensory aspects, e.g., change the experience mode, ambient lighting, air conditioning function, seat function, massage function, deliver a scent. E.g. controlling may comprise opening or offering a music related function if the system identifies the user is viewing a music app on the user terminal device. The controlling may be different based on the type of the user, e.g., according to whether the user is the driver, passenger and/or located in the front or rear seats.

The method may comprise the step of: estimating a performance indicator on the basis of the device status information and/or the user context. The performance indicator may be an output of the classification and/or estimation and may indicate the reliability thereof. The performance indicator may relate to a probability of an accuracy of the device status information and/or the user context.

The method may comprise the step of: performing a machine learning procedure on the basis of a learning input, relating to the estimation of the user context. The learning input may be a user input, e.g., in response to a prompting. The learning input may also be machine-generated, such as a success rate of classifying image information. Alternatively or additionally, the learning input may be received by the vehicle from an external server. In other words, performing the machine learning procedure may comprise performance evaluation aspects that are automated, e.g., sending back to an external server and/or cloud, and/or manual, e.g., involving periodic and/or routine user feedback and/or confirmation.

The classification may be performed on the basis of a classification library, and the method comprises the step of: receiving and/or updating library information relating to the classification library. The classification library may provide a relation between the image information and the device status information which is to be obtained by putting image information in a classifier. The classifier may then use the classification library to obtain the device status information from the image information. Receiving and/or updating the library may improve the accuracy and/or reliability of the classification, e.g., if the user interface of the output device has been updated, if a new application has been installed at the user terminal device, and/or if a new user terminal device is introduced into the vehicle.

The image information may relate to a plurality of output devices of one or more user terminal devices and/or one or more vehicle output devices, wherein the user context is estimated by correlating the image information relating to different of the output devices with each other. This applies, e.g., to both front and rear seat passengers, and enables to consider personalized zones for every seat and/or occupant. Thus, the user context and optionally controlling a function may be customized tailored to each seat and/or occupant. Furthermore, this enables considering objects in addition to the user terminal device, e.g., other smart-devices, the vehicle output device.

The context may be estimated under the consideration whether the user terminal device paired with the vehicle. In other words, it is attempted to evaluate if the or which of the user terminal devices is paired with the vehicle. For example, if the device is not connected to the vehicle, the vehicle system may issue a notification or display the device connectivity menu.

Furthermore, a data processing device is provided. The data processing device is adapted to perform the method as described herein. Moreover, the description given above with respect to the method applies mutatis mutandis to data processing device.

Furthermore, a vehicle is provided. The vehicle comprises the data processing device as described herein.

The vehicle may be an automobile, e.g., a car. The vehicle may be automated. The automated vehicle can be designed to take over lateral and/or longitudinal guidance at least partially and/or temporarily during automated driving of the automated vehicle. A control unit of the vehicle may be configured to control the automated driving at least partly. The vehicle may be a vehicle of autonomy level 0 to 5.

Furthermore, a computer program comprising instructions which, when the program is executed by a computer, cause the computer to carry out the above-described method at least partly.

The program may comprise any program code. The description given above with respect to the method applies mutatis mutandis to the computer program and vice versa.

Furthermore, a computer-readable medium comprising instructions which, when executed by a computer, cause the computer to carry out the above-described method at least partly.

The computer-readable medium may be any digital data storage device, such as a USB flash drive, a hard disk, a CD-ROM, an SD card or an SSD card. The above-described computer program may be stored on the computer-readable medium. However, the computer program does not necessarily have to be stored on such a computer-readable medium, but can also be obtained via the Internet.

The description given above with respect to the method applies mutatis mutandis to the computer-readable medium and vice versa.

The above-described features and advantages, as well as others, will become more readily apparent to those of ordinary skill in the art by reference to the following detailed description and accompanying drawings.

DETAILED DESCRIPTION

In the following embodiments are described with reference to FIGS. 1 to 3, wherein the same reference signs are used for the same objects throughout the description of the figures and wherein the embodiment is just one specific example for implementing the disclosure and does not limit the scope of the disclosure as defined by the claims.

Figures 1, 2:
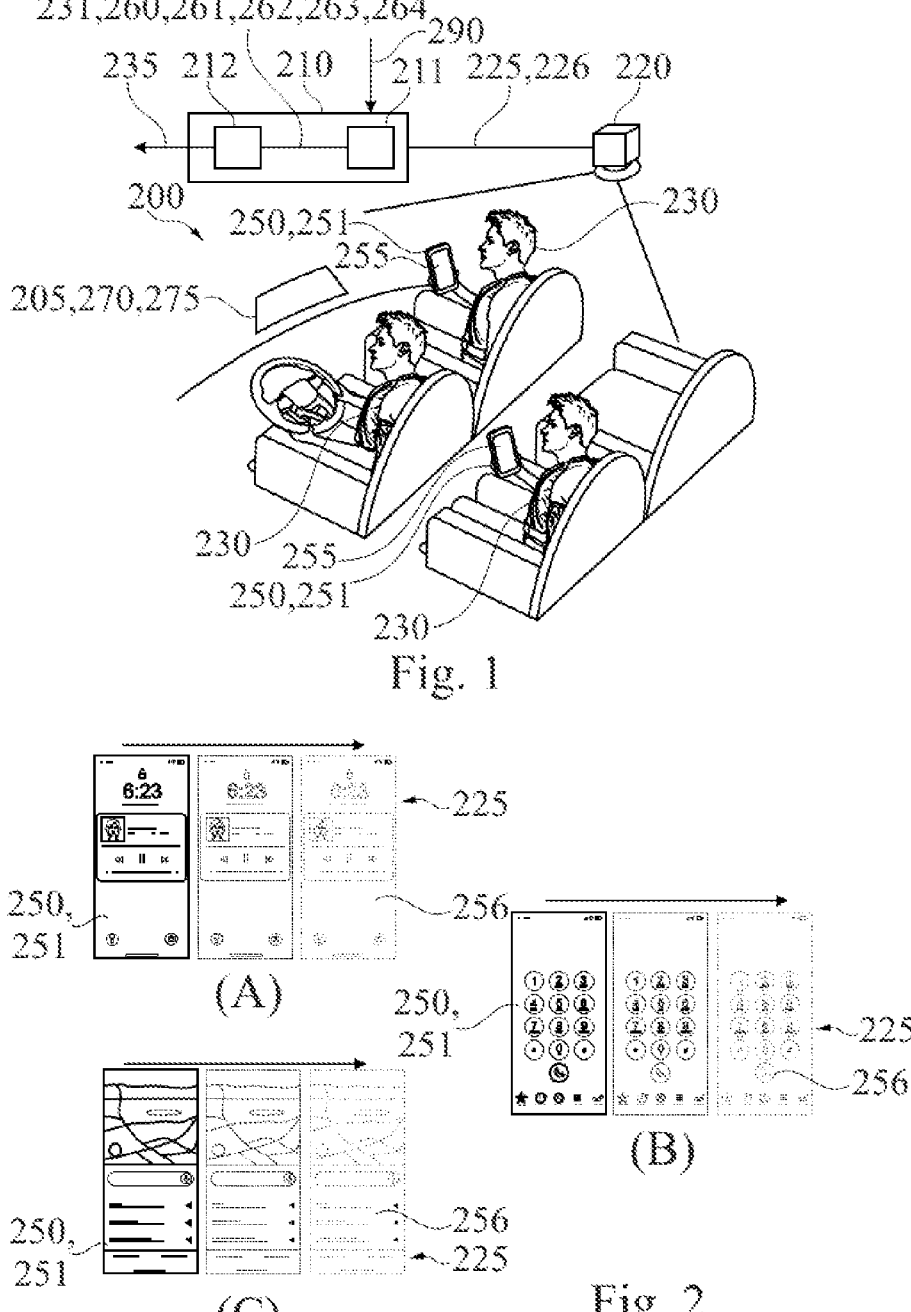
FIG. 1 shows schematically a vehicle according to an embodiment and a plurality of user terminal devices and of users within the vehicle.
FIG. 2 shows schematically a set of pixels of image information relating to a user terminal device which may be used to obtain a device status information.

FIG. 1 shows schematically a vehicle 200 according to an embodiment, and a plurality of user terminal devices 250 and of users 230 within the vehicle 200.

A plurality of users 230 is present within the vehicle 200. Each of the users 230 may use the vehicle 200 in a different context. One of the users 230 may drive the vehicle 200 and/or may be responsible for automated driving of the vehicle 200. Other users 230 may use a vehicle output device 205 and/or a user terminal device 250. The vehicle output device 205 may be a display, e.g., touchscreen, AR/VR glasses, HUD, personal touchscreen, panorama display. In FIG. 1, two of the users 230 use a respective user terminal device 250.

Each of the user terminal devices 250 comprises an output device 255 and runs an application 251. Therein, the output device 255 may comprise a LED and/or a display, e.g., a LC-Display. The output device 255 may comprise a predefined number of pixels being arranged in a matrix. The appearance of the user terminal device 250 and/or the output device 255 may reveal information about the state of the user terminal device 250 and/or an intent of the user 230.

The vehicle 200 comprises a camera 220 and a data processing device 210. The camera 220 is adapted to acquire image information 225 and/or a sequence 226 of image data comprising image information 225 relating to different time points. The camera 220 is adapted to acquire the image information 225 as RGB and/or IR image data. In another embodiment (not shown), the vehicle 200 comprises a plurality of cameras 220 to acquire image information 225 relating to different section of a cabin within the vehicle 200. Such a plurality of cameras 220 may comprise the possibility and likelihood of multiple cameras 220 located in the cabin, e.g., forwards facing and/or rearward facing, sensing front occupants and/or rear occupants, e.g., on a second, third and/or any other row of seats. Optionally, the vehicle 200 may comprise a depth sensing device, e.g. based on a TOF measurement and/or LIDAR. The camera 220 may be a driver camera, i.e., directed towards a driver face, or a cabin camera with a full and/or partial view of the entire cabin, driver and passengers.

Within the vehicle 200, the distance between the camera 220 and the user terminal device 230 may range from 0.2 m to 2 m. Given a typical resolution of the camera 220, and depending on a viewing angle and a size of the output device 255, the output device 255 may be resolved in the image information 225 as being acquired by the camera 220 by a relatively small number of pixels 256, e.g., from 16×16 to 32×32 (see also FIG. 2).

In addition, the image information 225 relates to a user 230 of the vehicle 200 and of the user terminal device 250. The image information 225 relates to a plurality of output devices 255 of user terminal devices 250 and to the vehicle output device 205.

The camera 220 and the data processing device 210 are connected with each other so that the data processing device 210 may receive and thus acquire the image information 225 from the camera 225. By the data processing device 210, the image information 225 may be used to both recognize, also called classify, identify and/or label as a category, objects and/or a user 230, to track objects and/or users 230.

The data processing device 210 comprises a classifier 211 and a context estimator 212. The classifier 211 is adapted to obtain, based on the image information 225, device status information 260 relating to the user terminal device 250 as described with reference to FIGS. 2 and 3. The device status information 260 comprises user interaction information 261. The device status information 260 comprises user terminal device information 262 relating to a type, an arrangement and/or an identity of the user terminal device 250, application information 263 relating to an application 251 which is executed by the user terminal device 250, and/or content information 264 relating to a cognitive content of an application 251 which is executed by the user terminal device 250.

The classifier 211 as shown in FIG. 1 performs a machine learning based algorithm for detection and recognition of objects. The classifier 211 comprises one or more Deep Neural Networks, DNNs. For example, DNNs with different functions can be combined, such as an image enhancement network, e.g., for extracting maximum information out of low resolution images, and an object recognition network, e.g., for classifying and tracking user terminal devices 250, adjacent objects, users 230 and user hands and/or fingers. Such a DNN can extract features such as objects, boundaries, edges, color, texture, intensity, change and/or motion. Therefore, the classifier 211 with a DNN may be trained with the appropriate datasets to recognize low-resolution pixel images of digital screens so that it is capable of accurately classifying the output device 255, e.g., is the phone locked or unlocked, which application is executed. Additionally, this information may be combined with conventional object or user recognition functionality. The classifier 211 employs image segmentation techniques such as "Minimal Image" or low-resolution object recognition and "superpixel" approaches for fast and efficient feature extraction and image processing. This allows an accurate classification of the image information 225, even if the image information 225 comprises only a limited number of pixels 256.

The classifier 211 is enabled for continued training to optimize the performance. The classifier 211 may classify objects with respect to a classification library. The classification library may be updated, e.g., by a cloud based approach where the library is trained for new versions and/or aspects of the user terminal device 250. For example, the classifier 211 may be updated to recognize new versions of digital screens as native operating systems, as a home screen, a lock screen, a setting menu, native apps for music, phone, maps, etc., and/or third-party apps, e.g., for streaming media content. Typically, the camera 220 comprises a fixed resolution, optionally a fixed view angle, assuming a fixed or static optics/lens arrangement. Therefore, the distance of the user terminal device 250 from the camera 220 may determine the number of pixels which are obtainable from the output device 255 of the user terminal device 250 by the camera 220. E.g. a front passenger phone is likely to be closer to the camera 220 than a rear passenger phone or vice versa, assuming a single camera 220 placed closer to one end of the cabin placed towards the front of the cabin or rear of the cabin, e.g. behind the passengers. The different pixel availability due to the different positions of occupants and their respective user terminal devices 250 in the vehicle 200 could be an opportunity to enhance the training of the classifier 211. Devices 250 that are closer to the camera 220 have more pixels available than devices 250 further from the camera 220. Therefore, it is likely that the accuracy of the classifier 211 is greater for devices 250 closer to the camera 220. The system could be setup to prioritize or bias training for devices 250 that have a higher pixel availability, i.e. devices 250 closer to the camera 220 which would help improve the accuracy of classifier 211 for devices 250 further away from the camera 220. A similar effect would be achievable with devices 250 that have a larger display/screen size. E.g., large mobile phone vs. mini mobile phone, etc.

The output of the classifier 211 is the labeled recognition of user terminal devices 250, output devices 255, other objects and/or users 230. The user 230 may have control over the recognition, e.g., as privacy measure, and may be able to actively pause and/or start the recognition capability if so desired.

The relationships between the user terminal devices 230, e.g., smart-devices, other objects and users 230 provide contextual data. For example, the arrangement of a user terminal device 250 relative to a user 230 may relate to the context, e.g., the user terminal device 250 being arranged in a hand of a user 250, a proximity to a face of the user 250, relative to other objects such as a bag and/or a credit card, relative to a cabin of the vehicle 200 such as being arranged on a seat, a surface, a charger, a holder and/or a cup holder.

The context estimator 212 is adapted to estimate the user context 235, based on the device status information 260 as described with reference to FIGS. 2 and 3. Based on the user context 235, a user entertainment device 270, the user terminal device 250 and/or a driver assistance device 275 may be controlled in dependence on the user context 235. For example, a user terminal device 250 that is not connected to the vehicle 200 may also provide a rich opportunity to provide different experiences that are relevant to the device 250. E.g. even if the device 250 is not connected to the vehicle 200, controlling would allow to use a feature and/or an application that does not require phone pairing or connectivity, such as media sharing without "pairing" or "connecting".

Additionally, the system may aggregate data, locally or in a cloud, on the inputs and outputs relative to the vehicle 200 and user context 235 to observe patterns of behaviors and inform future predictions that may improve the experience or performance of the system and/or vehicle 200.

FIG. 2 shows schematically a set of pixels 256 of image information 225 relating to a user terminal device 250 which may be used to obtain a device status information 260. FIG. 2 shows three different examples (A), (B) and (C). Therein, example (A) of FIG. 2 shows an application 251 relating to a home screen of the user terminal device 250. Example (B) of FIG. 2 shows an application 251 relating to a phone functionality of the user terminal device 250. Example (C) of FIG. 2 shows an application 251 relating to a map and/or navigation functionality of the user terminal device 250.

Each of examples of FIG. 2 has three different schematics. In each example, the left schematic relates to the output device 255 (not indicated) of the user terminal device 250 as it is being displayed by the output device 255 of the user terminal device 250. The middle schematic relates to image information 225 as it potentially could be acquired by a camera 220 when acquiring 110 image information 225 relating to the output device 255 with a comparably high resolution. The right schematic relates to image information 225 as it potentially could be acquired by a camera 220 when acquiring 110 image information 225 relating to the output device 255 with a comparably low resolution. Therein, individual pixels 256 are illustrated.

Thus, the resolution of the information may decrease from left to right as indicated by the respective arrow above each of the examples (A), (B), and (C). However, FIG. 2 illustrates that a comparably low resolution may be sufficient to recognize the application 251 that is executed by the user terminal device 250. In other non-shown embodiments, the number of pixels 256 and/or the aspect ratio may differ, depending on the camera 220, the distance between the camera 220 and the user terminal device 250 and the viewing angle. For example, arrangement of the camera 220 may determine the available pixels 256 of a front seat occupant's device 250 compared to a rear seat occupant's device 250, depending on the position of the camera 220.

Figure 3:
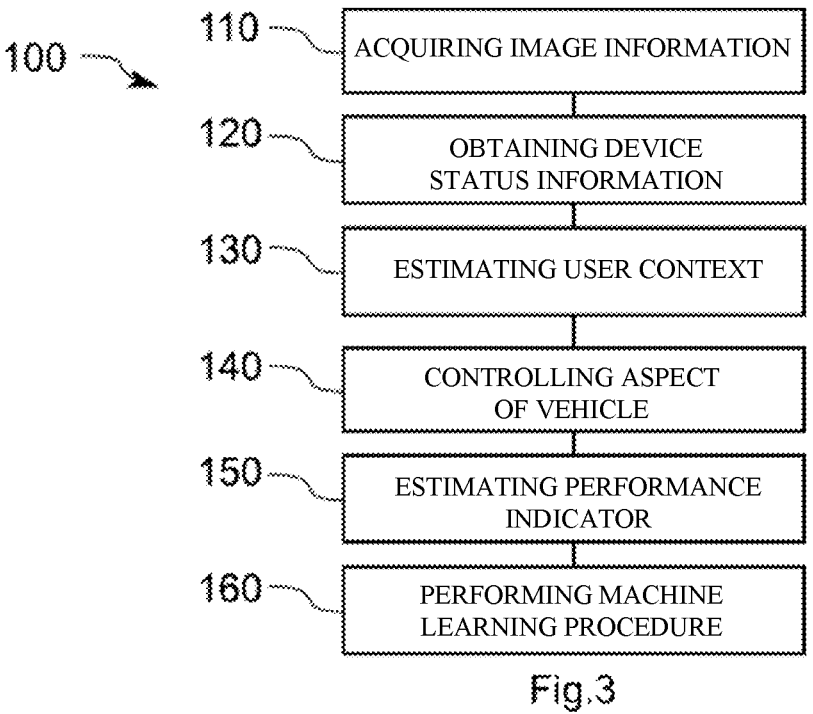
FIG. 3 shows a flowchart of the method for a vehicle for estimating a user context according to an embodiment.

FIG. 3 shows a flowchart of a method 100 for a vehicle 200 for estimating a user context 235 according to an embodiment. The method 100 is to be performed by the vehicle 200 as described with reference to FIG. 1.

According to FIG. 3, the method 100 comprises acquiring 110, by a camera 220 of the vehicle 200, image information 225 relating to an output device 255 of a user terminal device 250. The image information 225 comprises a sequence 226 of image data being captured by the camera 220 consecutively.

The method 100 comprises obtaining 120, by performing classification based on the image information 225, device status information 260 relating to the user terminal device 250. Therein, user information 231 is obtained based on the image information 225. The classification is based on at least one pixel 256 being acquired as image information 225.

The method 100 comprises estimating 130 the user context 235, based on the device status information 260. Therein, the user context 235 is estimated based on the user information 231. Estimating 130 the user context may comprise computing a probability of the user context 235 being determined correctly. The user context 235 is estimated by correlating the image information 225 relating to different of the output devices 255 with each other. The user context 235 is estimated under the consideration whether the user terminal device 250 paired with the vehicle 200.

The method 100 comprises controlling 140 an aspect of the vehicle 200, such as a user entertainment device 270, a user infotainment device (not indicated), a driver assistance device 275 and/or the user terminal device 250 in dependence on the user context 235. Based on the user context 235, the system may control, influence or adjust aspects of the vehicle 200 or cabin experience. These aspects may include experience modes, infotainment modes, entertainment modes, functions, features or GUI aspects that are relevant to the occupants, e.g., driver and/or passengers in front and/or rear.

The method 100 comprises estimating 150 a performance indicator 280 on the basis of the device status information 260 and/or the user context 235.

The method 100 comprises performing 160 a machine learning procedure on the basis of a learning input 290. The classification is performed on the basis of a classification library, and the method 100 comprises the step of: receiving and/or updating library information relating to the classification library.

The skilled person realizes that steps of the method 100 may be performed in an order different to the order of the steps as shown in FIG. 3. For example, the step of controlling 140 may be performed subsequently and/or simultaneously to estimating 150 the performance indicator 280 and/or to performing 160 the machine learning procedure.

The following relate to examples of the method 100: If the user 230 enters the vehicle 200 and the user 230 observes a smartphone and does not see that the smartphone is paired or connected—the system may predictively open the device or connectivity GUI menu, screen or panel, e.g. to assist the user in pairing the user terminal device 250. The system may additionally correlate the current event with past events. If the user terminal device 250 changes status when not actively being used, e.g., receives an incoming call or message, displays a notification or reminder, the system may activate the interior lighting, digital projection, e.g., digitally projects a light or a lighting effect around the user terminal device 250. If the user 230 has opened or is viewing a navigation application 251, the system may bring the navigation GUI feature and functionality to the foreground on the CID, HUD, Panorama HUD or highlight the device sharing options to be made available to the driver or passenger. If the user 230 has opened or is viewing a music application 251, the system may present a GUI panel or screen for music sharing or music functionality, e.g., share music via a personal audio zone. If the user 230 has opened or is viewing a movie application 251, the system may automatically change or offer the options for controlling the characteristics of the ambient lighting, issue a notification to share the movie on a nearby private or shared display, recline the seats. If the user 230 has opened or is viewing the phone or message application 251, the system may enhance noise cancellation, reduce audio volume, localize the audio to different personal audio zones, bring the communication GUI to the foreground of the vehicle CID, etc.

LIST OF REFERENCE SIGNS 100 method
110 acquiring image information
120 obtaining device status information
130 estimating user context
140 controlling
150 estimating performance indicator
160 performing machine learning procedure
200 vehicle
205 vehicle output device
210 data processing device
211 classifier
212 context estimator
220 camera
225 image information
226 sequence
230 user
231 user information
235 user context
250 user terminal device
251 application
255 output device
256 pixel
260 device status information
261 user interaction information
262 user terminal information 263 application information
264 content information
270 user entertainment device
275 driver assistance device
280 performance indicator
290 learning input

The invention claimed is:

1. A method for a vehicle for estimating a user context, comprising:
  acquiring, by a camera of the vehicle, image information relating to an output device of a user terminal device, wherein the image information includes no personalized content displayed on the output device;
  obtaining, by performing classification based on the image information, device status information relating to the user terminal device; and
  estimating the user context, based on the device status information.

2. The method as claimed in claim 1, wherein the output device displays at least one item of personalized content, wherein the classification is based on at least one pixel being acquired as image information wherein a set of pixels contain the output device, wherein said set of pixels has a resolution insufficient to obtain the at least one item of personalized content.

3. The method as claimed in claim 1, wherein the image information comprises a sequence of image data being captured by the camera consecutively.

4. The method as claimed in claim 3, wherein the device status information comprises user interaction information.

5. The method as claimed in claim 1, wherein the device status information comprises user terminal device information relating to a type of the user terminal device, an arrangement and/or an identity of the user terminal device, application information relating to an application which is executed by the user terminal device, and/or content information relating to a cognitive content of an application which is executed by the user terminal device.

6. The method as claimed in claim 5, further comprising: controlling a user entertainment device, the user terminal device and/or a driver assistance device in dependence on the user context.

7. The method as claimed in claim 1, wherein the device status information comprises user terminal device information relating to a type of the user terminal device.

8. The method as claimed in claim 1, wherein the device status information comprises application information relating to an application which is executed by the user terminal device.

9. The method as claimed in claim 1, wherein the device status information comprises user terminal device information relating content information relating to a cognitive content of an application which is executed by the user terminal device.

10. The method as claimed in claim 1, wherein the image information relates to a user of the vehicle and/or of the user terminal device, and wherein the method further comprises obtaining user information based on the image information, wherein the user context is estimated based at least in part on the user information.

11. The method as claimed in claim 10, further comprising: controlling a user entertainment device, the user terminal device and/or a driver assistance device in dependence on the user context.

12. The method as claimed in claim 1, further comprising: controlling a user entertainment device, the user terminal device and/or a driver assistance device in dependence on the user context.

13. The method as claimed in claim 1, further comprising: estimating a performance indicator based at least in a part on the device status information and/or the user context, the performance indicator relating to a probability of an accuracy of the device status information and/or the estimated user context.

14. The method as claimed in claim 13, further comprising performing a machine learning procedure relating to the estimating of the user context on the basis of a learning input.

15. The method as claimed in claim 1, wherein the classification is performed based at least in part on a classification library, and wherein the method further comprises receiving updated library information relating to the classification library.

16. The method as claimed claim 1, wherein:
  the image information relates to a plurality of output devices of one or more user terminal devices and/or one or more vehicle output devices; and
  the user context is estimated by correlating the image information relating to different of the output devices with each other.

17. The method as claimed claim 1, wherein the user context is estimated based at least in part on whether the user terminal device paired with the vehicle.

18. A data processing device, wherein the data processing device is adapted to perform the method as claimed in claim 1.

19. A vehicle, comprising the data processing device as claimed in claim 18.

20. A non-transitory computer-readable storage medium, comprising instructions, which when executed by a computer, cause the computer to carry out the method as claimed in claim 1.

* * * * *